US012766702B2

(12) United States Patent
Zhou et al.

(10) Patent No.: US 12,766,702 B2
(45) Date of Patent: Oct. 20, 2026

(54) ROBOTIC ARMS AND ROBOTIC SYSTEMS COMPRISING THE SAME

(71) Applicant: Hong Kong Centre for Logistics Robotics Limited, Hong Kong (CN)

(72) Inventors: Jianshu Zhou, Hong Kong (CN); Junda Huang, Hong Kong (CN); Yunhui Liu, Hong Kong (CN)

(73) Assignee: HONG KONG CENTRE FOR LOGISTICS ROBOTICS LIMITED, Hong Kong (CN)

( * ) Notice: Subject to any disclaimer, the term of this patent is extended or adjusted under 35 U.S.C. 154(b) by 35 days.

(21) Appl. No.: 19/002,653

(22) Filed: Dec. 26, 2024

(65) Prior Publication Data

US 2026/0183934 A1 Jul. 2, 2026

(51) Int. Cl.
*B25J 9/10* (2006.01)

(52) U.S. Cl.
CPC ............. *B25J 9/102* (2013.01); *B25J 9/1065* (2013.01)

(58) Field of Classification Search
CPC ........ B25J 9/003; B25J 9/0045; B25J 9/0048; B25J 9/102; B25J 9/106; B25J 17/00; B25J 18/04
See application file for complete search history.

(56) References Cited

U.S. PATENT DOCUMENTS

| | | | | | |
|---|---|---|---|---|---|
| 12,064,869 | B2 * | 8/2024 | Au | B25J 18/02 | |
| 2012/0067156 | A1 * | 3/2012 | Chen | B25J 9/106 | 901/27 |

FOREIGN PATENT DOCUMENTS

| | | | | | |
|---|---|---|---|---|---|
| CN | 114474016 | A * | 5/2022 | B25J 9/003 | |
| CN | 117484478 | A * | 2/2024 | B25J 9/003 | |
| CN | 118418101 | A * | 8/2024 | B25J 9/003 | |
| CN | 118721155 | A * | 10/2024 | B25J 11/00 | |
| KR | 101417482 | B1 * | 7/2014 | B25J 17/0258 | |
| WO | WO-2023048133 | A1 * | 3/2023 | B25J 9/1623 | |

* cited by examiner

*Primary Examiner* — Bobby Rushing, Jr.
(74) *Attorney, Agent, or Firm* — EAGLE IP LIMITED

(57) ABSTRACT

In certain embodiments, provided is a robotic arm and robotic system comprising the same. In certain embodiments, the robotic arm contains a base unit and a driving unit, wherein the base unit contains a base motor and a base, the driving unit contains a quadrilateral link mechanism, a first driving motor and a second driving motor. Other example embodiments are described herein. In certain embodiments, the robotic arm achieves both rotational and linear motion while minimizing physical footprints for easier storage and transportation.

20 Claims, 14 Drawing Sheets

ROBOTIC ARMS AND ROBOTIC SYSTEMS COMPRISING THE SAME

FIELD OF INVENTION

This application relates to robotics, in particular, robotic arms and robotic systems comprising the same.

BACKGROUND OF INVENTION

Robotic arms are widely used in various industrial applications, with many systems relying on serial or parallel linkages to provide multi-degree-of-freedom (DoF) movements. Traditional robotic arms typically face challenges such as limited workspace, complex mechanical designs, and large physical footprints. As industries demand more compact, flexible, and versatile robotic solutions, new robotic designs are necessary to improve efficiency in confined spaces while maintaining functionality. There is an urgent need for robotic arms and systems that can achieve both rotational and linear motion while minimizing their spatial footprint for easier storage and transportation, which is crucial in modern robotics.

SUMMARY OF INVENTION

In certain embodiments, this invention addresses at least some of these challenges by proposing a modular, foldable robotic arm design that combines the benefits of serial linkage mechanisms with a compact folding structure.

Disclosed herein is a novel robotic arm and system thereof using a foldable structure for both linear and rotation motion.

In some embodiments, the robotic arm includes a base unit and a driving unit that are operatively connected with each other.

In some embodiments, the base unit includes a base motor that is operatively connected with the driving unit and is configured to drive the driving unit to move in at least one degree of freedom, and a base that is configured to support the base motor and the driving unit.

In some embodiments, the driving unit includes a quadrilateral link mechanism, first driving motor that is operatively connected with the quadrilateral link mechanism and is configured to drive the quadrilateral link mechanism to be switchable at least between a retracted state and an extended state, and a second driving motor that is operatively connected with the quadrilateral link mechanism and is configured to drive the quadrilateral link mechanism to be switchable at least from the extended state to at least one bending state.

There are many advantages of the invention. In certain embodiments, this design enables the robotic arm to perform complex tasks traditionally executed by serial robotic arms while also incorporating folding and linear motion capabilities, allowing it to reduce its physical size when needed. In certain embodiments, provided robotic arms is a versatile, space-saving robotic arm that can operate efficiently in compact environments while offering both rotational and linear movements.

In certain embodiments, provided robotic arms have one or more of the following advantages:

A. Compact Folding Design: In certain embodiments, the provided robotic arm integrates a parallelogram structure, allowing it to fold into a small footprint when not in use, significantly reducing space requirements. This makes it ideal for applications in confined spaces or where portability is a priority.

B. Combined Linear and Rotational Motion: Unlike traditional robotic arms that rely exclusively on rotational joints, in certain embodiments, this design enables linear motion through the parallelogram linkage, providing greater versatility for tasks requiring both linear extension and precise rotational manipulation.

C. Modularity: In certain embodiments, the provided robotic arm contains three modular units, each with independent motors and control, which simplifies both maintenance and customization for different tasks or environments.

D. Structural Integrity with Flexibility: In certain embodiments, the design ensures that despite its folding capability, the robotic arm retains sufficient strength and rigidity to perform heavy-duty tasks, something many foldable designs struggle with.

DETAILED DESCRIPTION

Definitions

Figure 1:
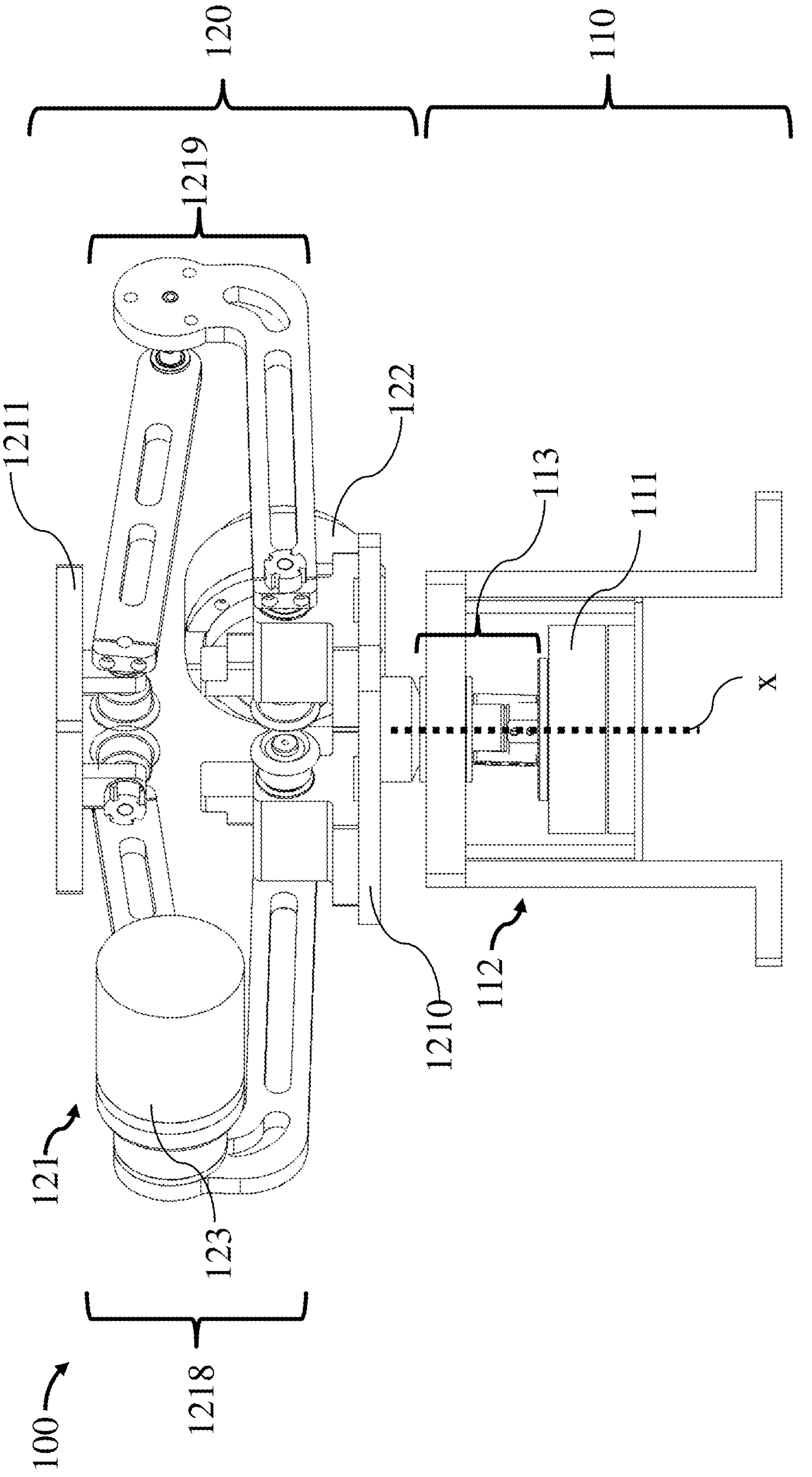
FIG. 1 is a perspective view of an example robotic arm, according to an example embodiment.

As used herein and in the claims, the terms "comprising" (or any related form such as "comprise" and "comprises"), "including" (or any related forms such as "include" or "includes"), "containing" (or any related forms such as "contain" or "contains"), means including the following elements but not excluding others. It shall be understood that for every embodiment in which the term "comprising" (or any related form such as "comprise" and "comprises"), "including" (or any related forms such as "include" or "includes"), or "containing" (or any related forms such as "contain" or "contains") is used, this disclosure/application also includes alternate embodiments where the term "comprising," "including," or "containing," is replaced with "consisting essentially of" or "consisting of." These alternate embodiments that use "consisting of" or "consisting essentially of" are understood to be narrower embodiments of the "comprising", "including," or "containing" embodiments.

As used herein and in the claims, the terms "comprising" (or any related form such as "comprise" and "comprises"), "including" (or any related forms such as "include" or "includes"), "containing" (or any related forms such as "contain" or "contains"), means including the following elements but not excluding others. It shall be understood that for every embodiment in which the term "comprising" (or any related form such as "comprise" and "comprises"), "including" (or any related forms such as "include" or "includes"), or "containing" (or any related forms such as "contain" or "contains") is used, this disclosure/application also includes alternate embodiments where the term "comprising", "including," or "containing," is replaced with "consisting essentially of" or "consisting of". These alternate embodiments that use "consisting of" or "consisting essentially of" are understood to be narrower embodiments of the "comprising", "including," or "containing," embodiments.

As used herein and in the claims, the singular forms "a," "an," and "the" are intended to include the plural forms as well unless the context clearly indicates otherwise. Where a range is referred to in the specification, the range is understood to include each discrete point within the range. For example, 1-7 means 1, 2, 3, 4, 5, 6, and 7.

As used herein and in the claims, the term "about" is understood as within a range of normal tolerance in the art and not more than ±10% of a stated value. By way of example only, about 50 means from 45 to 55, including all values in between. As used herein, the phrase "about" a specific value also includes the specific value, for example, about 50 includes 50.

As used herein and in the claims, the terms "general" or "generally", or "substantial" or "substantially" mean that the recited characteristic, angle, shape, state, structure, or value need not be achieved exactly, but that deviations or variations, including for example, tolerances, measurement error, measurement accuracy limitations and other factors known to those of skill in the art, may occur in amounts that do not preclude the effect the characteristic was intended to provide. For example, an object that has a "generally" cylindrical shape would mean that the object has either an exact cylindrical shape or a nearly exact cylindrical shape. In another example, an object that is "substantially" perpendicular to a surface would mean that the object is either exactly perpendicular to the surface or nearly exactly perpendicular to the surface, e.g., has a 5% deviation.

It is to be understood that terms such as "left," "right," "upper," "lower," "top," "bottom," "middle," "side," "bottom," "length," "inner," "outer," "interior," "exterior," "outside," "inward," "outward" and the like as may be used herein, merely describe points of reference and do not limit the present invention to any particular orientation or configuration.

Further, terms such as "first," "second," "third," etc., merely identify one of a number of portions, components, and/or points of reference as disclosed herein and likewise do not limit the present invention to any particular configuration or orientation.

As used herein, "connecting," "connect," and "connected" means directly or indirectly joining or linking other elements. In some examples, these terms mean (directly or indirectly) physically joining or linking other elements.

As used herein and in the claims, "operatively connects" or "operatively connected" refers to a functional or operational connection between two components or systems that allows them to work together or interact with each other. Such connection may be direct or indirect and, may be physical, functional, and/or electronical.

As used herein and in the claims, the term "movable" refers to having the ability to move, for example, having the ability to change position.

As used herein and in the claims, the terms "robotic arm" and "arm" are used interchangeably and refer to a mechanical arm comprising one or more segments connected by joints, capable of performing specific movements and provide at least one degree of freedom (DoF). In some examples, the robotic arm is configured to manipulate an end effector such as a robotic hand for interacting with one or more target objects or performing functions in a variety of applications, such as industrial, medical, or service environments. In some examples, the robotic arm performs rotational and/or translational movements.

As used herein and in the claims, the term "motor" refers to a device or component that converts electrical, hydraulic, or pneumatic energy into mechanical energy, such as producing rotational or linear motion. In some examples, the motor is configured to drive a shaft or other mechanical components within a system, enabling motion and power transfer to perform specific tasks.

As used herein and in the claims, the term "proximal" refers to a section or part that is closer to the end effector regarding mechanical connections along the structure of the robotic arm.

As used herein and in the claims, the term "distal" refers to a section or part that is away from the end effector regarding mechanical connections along the structure of the robotic arm.

As used herein and in the claims, the terms "articulation," "articulated," and "articulately" refer to a configuration of connecting or joining mechanical components in a manner that allows relative movement, such as rotation, bending, or pivoting, between them. This involves mechanical joints or linkages that enable controlled and purposeful motion within a system.

As used herein and in the claims, the term "first central axis" refers to a straight line that extends in the longitudinal direction of the main shaft, substantially passing through its geometric center along its entire length.

As used herein and in the claims, the term "second central axis" refers to a straight line that connects the geometric centers of the execution unit base and the driving unit base.

As used herein and in the claims, the term "quadrilateral link mechanism" refers to a mechanical linkage system containing four links or members arranged to form a closed quadrilateral structure that enables controlled movement and force transfer between the links or members, allowing specific relative motion of the connected components. In some examples, the four interconnected links or members are articulately connected to one another. In some examples, the four links or members substantially have the same length and are arranged in the form of a parallelogram. In other examples, the four links may have different lengths. For example, the four links may be two pairs of adjacent equal-length links forming a kite, wherein one pair may (or may not) have a different length from the other pair. In some examples, multiple quadrilateral link mechanisms are operatively connected to one another serially or in other arrangements. In some examples, the links or members are or contain cranks.

As used herein and in the claims, the term "retracted state" refers to a configuration of the quadrilateral link mechanism in which the links or members are retracted to each other such that the execution unit base is disposed closer to the driving unit base along the second central axis. The two joints connecting the links or members are disposed away from one another on opposite sides of the second central axis. The links or members are arranged to reduce the distance of the end effector connected with the execution unit base from the base unit connected with the driving unit base, thereby facilitating efficient storage or reduced operational reach. For clarity's sake, the quadrilateral link mechanism may have various (or continuous) retracted states in different degrees of retraction. In some examples, the connected links or members are retracted to their closest functional positions to form a "fully retracted state."

As used herein and in the claims, the term "extended state" refers to a configuration of the quadrilateral link mechanism in which the links or members are extended from each other such that the execution unit base is disposed away from the driving unit base. The two joints connecting the links or members are disposed closer to one another on opposite sides of the second central axis. The links or members are arranged to increase the distance of the end effector connected with the execution unit base from the base unit connected with the driving unit base, thereby facilitating performing tasks requiring longer reach. For clarity's sake, the quadrilateral link mechanism may have various (or continuous) extended states in different degrees of extension. In some examples, the connected links or members are extended to their farthest functional positions to form a "fully extended state."

As used herein and in the claims, the term "bending state" refers to a configuration of the quadrilateral link mechanism in which the links or members are pre-positioned at the fully extended state, with two joints between the extended links engaged with each other, allowing for relative rotational movement of the upper pair of links or members (above the engaged joints) relative to the lower pair of links or members (about the engaged joints). In the bending states, the engaged two joints operate simultaneously on the same side of the second central axis. This enables controlled angular adjustment between the two sets of links or members while maintaining the structural integrity of the mechanism. For clarity's sake, the quadrilateral link mechanism may have various (or continuous) bending states in different degrees of bending.

As used herein and in the claims, the terms "vertical" and "vertically" refer to configuration of being in the directions parallel to the second central axis.

As used herein and in the claims, the terms "horizontal" and "horizontally" refer to a configuration of being in the directions perpendicular to the second central axis.

As used herein and in the claims, the term "active" refers to a component or element that requires a direct, external power source to perform its intended function, or that actively generates, initiates, or controls movement, force, or energy within a system. In some examples, active components are capable of interacting with other parts of the mechanism such as through electric, hydraulic, and/or mechanical input.

As used herein and in the claims, the term "passive" refers to a component or element that does not require a direct, external power source to function and typically responds to external forces or actions without actively generating movement or control. In some examples, passive components provide structural support, guidance, or response to forces initiated by one or more active components.

Although the description referred to particular embodiments, the disclosure should not be construed as limited to the embodiments set forth herein.

In some embodiments, provided is a modular robotic arm, consisting of or containing three distinct modules: a base module, a driving module and an execution module. Each module provides at least one degree of freedom (DoF). The base module contains a motor that drives a primary rotation joint, which serves as the foundation for the robotic arm's motion. In some embodiments, connected to this base module is a set of four parallel links, configured in the form of a parallelogram as the driving module. These links provide structural integrity and flexibility in movement. The execution module operatively connects with the driving module and an end effector for actuation.

In some embodiments, each module is serially connected to the next, allowing for independent motion and contributing to the overall dexterity of the robotic arm. In some embodiments, the design incorporates two motors within the driving module. One motor is located at a specific joint of the parallelogram to control the linear motion of the links, facilitating both extension and folding. A second motor is installed at the neighboring joint to enable the rotation of the links when they are fully extended.

In some embodiments, the provided robotic arms and systems involve a combination of serial robotic arm mechanics with a unique parallelogram linkage that provides additional linear and folding capabilities. In some embodiments, the quadrilateral or parallelogram structure enables the robotic arm to collapse into a compact form while extending to perform tasks that require longer reach.

In some embodiments, the use of linear motion, driven by one of the motors, allows the arm to fold and extend as needed. The folding mechanism enables the arm to minimize its footprint when not in use or when operating in constrained spaces. In some embodiments, the other motor provides rotational movement around a key joint, ensuring the arm can rotate and allows an end effector to manipulate objects with high precision.

In some embodiments, the following methodology are involved:

A. Base Motor Control: In some embodiments the base motor enables the entire arm to rotate about its axis, providing the foundational rotational degree of freedom.

B. Linear Motion Actuation: In some embodiments, a dedicated motor at one of the quadrilateral link mechanism's joints drives linear motion. This causes the links to either extend or fold in a smooth, controlled manner.

C. Rotational Motion of Links: In some embodiments, a second motor, placed at the neighboring joint, allows the four links to rotate around this joint when it is fully extended. This feature allows executing tasks that require a combination of linear extension and rotational manipulation.

In some embodiments, this configuration provides a highly adaptable robotic arm that can perform traditional tasks, such as object manipulation and positioning, and unique tasks involving linear extension, folding, and compact storage.

In some embodiments, provided robotic arms and systems possess one or more of the following technical features and functional advantages:

A. Quadrilateral-Based Folding Mechanism:

Technical Differences: When compared to traditional serial or parallel robotic arms, which rely solely on rotational joints or complex linkage systems, in some embodiments, provided robotic arms and systems utilize a parallelogram or quadrilateral link structure containing four links. This allows for smooth, controlled linear extension and folding of the arm.

Functional Advantage: In some embodiments, the arm can fold into a compact form, making it highly space-efficient while retaining the capability to extend linearly. This feature enables the arm to operate in both confined spaces and larger workspaces, a function that traditional robotic arms cannot achieve simultaneously.

B. Linear Motion Capability:

Technical Differences: When compared to most traditional arms focusing on rotational motion across joints, with little to no capacity for linear motion, in certain embodiments, provided robotic arms and systems integrate a motor-driven linear motion mechanism through one of the quadrilateral link mechanism's joints.

Functional Advantage: The ability to perform linear extension allows the arm to reach straight into tight spaces or extend its reach dynamically, which is particularly useful in assembly lines, inspection tasks, or operations where linear accuracy is essential. Traditional arms lack this level of versatility.

C. Dual Actuation in the Parallelogram:

Technical Differences: In some embodiments, provided robotic arms and systems utilizes two motors at neighboring joints of the quadrilateral link mechanism: one motor to control the linear motion (folding and extending), and the other motor to enable the rotational movement of the extended links. This dual-actuation system is not present in conventional serial or foldable robotic arm designs.

Functional Advantage: In some embodiments, this design allows for both precise rotational manipulation and the ability to transition seamlessly between folded and extended states, without sacrificing strength or stability during operation. Traditional foldable designs often compromise on either linear or rotational capabilities.

D. Modularity:

Technical Differences: In some embodiments, provided robotic arm is contains three modular units, individual with its own DoF, enabling flexible and independent control. This modular design is distinct from both traditional serial robotic arms and foldable arms, which typically lack such modularity.

Functional Advantage: In some embodiments, modularity enhances ease of maintenance and the ability to configure the robotic arm for different applications. It also allows for the replacement or upgrade of individual modules, providing greater customization and reducing downtime. Traditional designs often require the entire arm to be replaced or repaired when a single component fails.

E. Compact and Efficient Design:

Technical Differences: While some traditional arms attempted to minimize the size, in some embodiments, provided robotic arms and systems balances compactness (when folded) and extended functionality and outperforms traditional arms in both compact storage and functional range, making it suitable for mobile robots, portable systems, or environments with limited space. Traditional designs either sacrifice size for functionality or require more complex systems to achieve similar results.

In summary, in some embodiments, the present invention is technically distinct due to using a parallelogram linkage system or quadrilateral link mechanism, dual motor-driven actuation, and modular construction. Functionally, provided robotic arms and systems surpass traditional arms by combining linear extension, rotational manipulation, and compact folding into a single, efficient design.

NUMBERED EMBODIMENTS

Embodiment 1. A robotic arm, comprising a base unit and a driving unit that are operatively connected with each other, wherein the base unit comprises a base motor that is operatively connected with the driving unit and is configured to drive the driving unit to move in at least one degree of freedom; and a base that is configured to support the base motor and the driving unit, and wherein the driving unit comprises a quadrilateral link mechanism; a first driving motor that is operatively connected with the quadrilateral link mechanism and is configured to drive the quadrilateral link mechanism to be switchable at least between a retracted state and an extended state; and a second driving motor that is operatively connected with the quadrilateral link mechanism and is configured to drive the quadrilateral link mechanism to be switchable at least from the extended state to a bending state.

Embodiment 2. The robotic arm of embodiment 1, wherein the quadrilateral link mechanism comprises an execution unit base plate for connecting with an end effector; a driving unit base plate for connecting with the base unit; a pair of upper cranks and a pair of lower cranks, each of which comprises a proximal portion and a distal portion; an upper bevel gear assembly; a lower bevel gear assembly; a first shaft and a second shaft, wherein the upper bevel gear assembly operatively connects the proximal portions of the pair of upper cranks with the execution unit base plate, wherein the lower bevel gear assembly operatively connects the distal portions of the pair of lower cranks with the driving unit base plate, and wherein the first shaft and the second shaft articulately connect the distal portions of the pair of upper cranks with the proximal portions of the pair of lower cranks to form a first joint and a second joint, respectively, such that an articulated, quadrilateral link mechanism is formed.

Embodiment 3. The robotic arm of embodiment 2, wherein, at the extended state, the first joint engages with the second joint to form an articulation joint such that the pair of upper cranks is rotatable relative to the pair of lower cranks about the articulation joint, thereby switching to the bending state.

Embodiment 4. The robotic arm of any of the embodiments 2 to 3, wherein the second driving motor is operatively connected with the first joint via the first shaft.

Embodiment 5. The robotic arm of any of the embodiments 2 to 4, wherein the first joint further comprises a clutch unit that reversibly engages and disengages the second driving motor with the first shaft at the extended state.

Embodiment 6. The robotic arm of any of the embodiments 2 to 5, wherein the second joint is a passive joint and further comprises a joint bearing unit to support the second shaft to maintain central position thereof.

Embodiment 7. The robotic arm of any of the embodiments 2 to 6, wherein the upper bevel gear assembly comprises a pair of active upper bevel gear units driven by the pair of upper cranks respectively, and a pair of passive upper bevel gear units engaged with the pair of active upper bevel gear units and connected with the execution unit base plate, such that motion of the pair of upper cranks is translated to motion of the execution unit base plate.

Embodiment 8. The robotic arm of embodiment 7, wherein the upper bevel gear assembly further comprises a pair of active upper shafts transmitting motion of the pair of upper cranks to motion of the pair of active upper bevel gear units, and a pair of passive upper shafts connected to the pair of passive upper bevel gear units.

Embodiment 9. The robotic arm of any of the embodiments 8, wherein the upper bevel gear assembly further comprises a pair of active upper bearing housings and a pair of passive upper bearing housings, which are connected to the execution unit base plate and respectively support the pair of active upper shafts and the pair of passive upper shafts to maintain central position thereof.

Embodiment 10. The robotic arm of any of the embodiments 8 to 9, wherein the upper bevel gear assembly further comprises a pair of upper locking nuts, configured to restrict axial movement of the pair of passive upper shafts.

Embodiment 11. The robotic arm of any of the embodiments 2 to 10, wherein the lower bevel gear assembly comprises an active lower bevel gear unit driven by the first driving motor; and a pair of passive lower bevel gear units engaged with the active lower bevel gear unit and connected with the distal portions of the pair of lower cranks respectively, such that motion from the first driving motor is translated to motion of the pair of lower cranks.

Embodiment 12. The robotic arm of embodiment 11, wherein the lower bevel gear assembly further comprises a pair of passive lower shafts respectively connected with the distal portions of the pair of lower cranks.

Embodiment 13. The robotic arm of any of the embodiments 12, wherein the lower bevel gear assembly further comprises a pair of lower bearing housings, connected with the driving unit base plate and supporting the pair of passive lower shafts to maintain central positions thereof.

Embodiment 14. The robotic arm of any of the embodiments 12 to 13, wherein the lower bevel gear assembly further comprises a pair of lower locking nuts, configured to restrict axial movement of the pair of passive lower shafts respectively.

Embodiment 15. The robotic arm of any of the embodiments 2 to 14, wherein the lower bevel gear assembly further comprises one or more support limit blocks, configured to restrict the downward movement range of the driving unit to prevent damage to the robotic arm.

Embodiment 16. The robotic arm of any of the embodiments 2 to 15, wherein the base motor is connected with the driving unit base plate via a main shaft such that the rotation of the base motor is transmitted to motion of the driving unit.

Embodiment 17. A robotic arm for an end effector, comprising a base unit and a driving unit that are operatively connected with each other, wherein the base unit comprises a base motor that is operatively connected with the driving unit and is configured to drive the driving unit to rotate about central axis thereof; and a base that is configured to support the base motor and the driving unit, wherein the driving unit comprises a quadrilateral link mechanism; a first driving motor that is operatively connected with the quadrilateral link mechanism and is configured to drive the quadrilateral link mechanism to be switchable at least between a retracted state and an extended state; and a second driving motor that is operatively connected with the quadrilateral link mechanism and is configured to drive the quadrilateral link mechanism to be switchable at least from the extended state to a bending state, wherein the quadrilateral link mechanism comprises an execution unit base plate for connecting with the end effector; a driving unit base plate for connecting with the base unit; a pair of upper cranks and a pair of lower cranks, each of which comprises a proximal portion and a distal portion; an upper bevel gear assembly; a lower bevel gear assembly; a first shaft and a second shaft, wherein the upper bevel gear assembly operatively connects the proximal portions of the pair of upper cranks with the execution unit base plate, wherein the lower bevel gear assembly operatively connects the distal portions of the pair of lower cranks with the driving unit base plate, wherein the first shaft and the second shaft articulately connect the distal portions of the pair of upper cranks with the proximal portions of the pair of lower cranks to form a first joint and a second joint, respectively, such that an articulated, quadrilateral link mechanism is formed, and wherein, at the extended state, the first joint engages with the second joint to form an articulation joint such that the pair of upper cranks is rotatable relative to the pair of lower cranks about the articulation joint, thereby switching to the bending state.

Embodiment 18. A robotic system, comprising: one or more robotic arms as described in embodiments 1 to 17; and one or more end effectors, wherein the robotic arms and the end effectors are operatively connected with each other.

Embodiment 19. The robotic system of embodiment 18, wherein the end effector is a robotic hand.

EXAMPLES

Provided herein are examples that describe in more detail certain embodiments of the present disclosure. The examples provided herein are merely for illustrative purposes and are not meant to limit the scope of the invention in any way. All references given below and elsewhere in the present application are hereby included by reference.

Robotic Arm

FIG. 1-6D show an example robotic arm 100 and the components thereof. FIG. 1 shows a perspective view of the example robotic arm 100, which generally contains a base unit 110 and a driving unit 120. The base unit 110 contains a base motor 111, a base 112, and a main shaft unit 113. A first central axis x, represented in dotted line, extends in the longitudinal direction of the main shaft 1130, passing through its geometric center along its entire length. The base motor 111 is configured to drive the driving unit 120 via the main shaft unit 113, which translates the rotary motion of the base motor 111 to the driving unit 120 substantially about the first central axis x. In this example, the base motor 111 is a HO7213 servo motor (Tonifishi). The base 112 is a supporting body for the overall support and installation of the example robotic arm 100.

Still referring to FIG. 1A, the driving unit 120 generally contains a quadrilateral link mechanism 121, a first driving motor 122, and a second driving motor 123, which will all be described in more detail later.

Still referring to FIG. 1, The quadrilateral link mechanism 121 contains a driving unit base 1210, an execution unit base 1211, a first joint 1218, and a second joint 1219. The driving unit base 1210 is connected to the main shaft unit 113 at the lower side and to the quadrilateral link mechanism 121 at the opposing upper side, thereby transmitting the rotary motion from the main shaft unit 113 to the driving unit 120. The execution unit base 1211 is configured to connect and directly or indirectly support one or more components of an execution unit installed above. In some examples, the one or more components of the execution unit are one or more end effectors, such as a robotic hand. In some examples, the robotic system contains more than one robotic arms 100 such that multiple robotic arms 100 can be modularly connected with one another (e.g., one by one) to form a complex robotic arm.

Still referring to FIG. 1, the first driving motor 122 is operatively connected with and drives the lower part of the quadrilateral link mechanism 121, i.e. the parts of the quadrilateral link mechanism 121 below the first joint 1219 and the second joint 1219, such that the quadrilateral link mechanism 121 can be switchable between different retracted states and extended states. In this example, the first driving motor 122 is a Maita X6-40 motor (Suzhou Micro Actuator Technology Co., Ltd.).

Still referring to FIG. 1, the second driving motor 123 is connected to the first joint 1218, thereby driving the upper part of the quadrilateral link mechanism 121, i.e. the parts of the quadrilateral link mechanism 121 above and including the first joint 1218 and second joint 1219, such that the quadrilateral link mechanism 121 can be switchable between different bending states. In this example, the second driving motor 123 is a Maita X4-24 motor (Suzhou Micro Actuator Technology Co., Ltd.).

Driving Unit

Figure 2A:
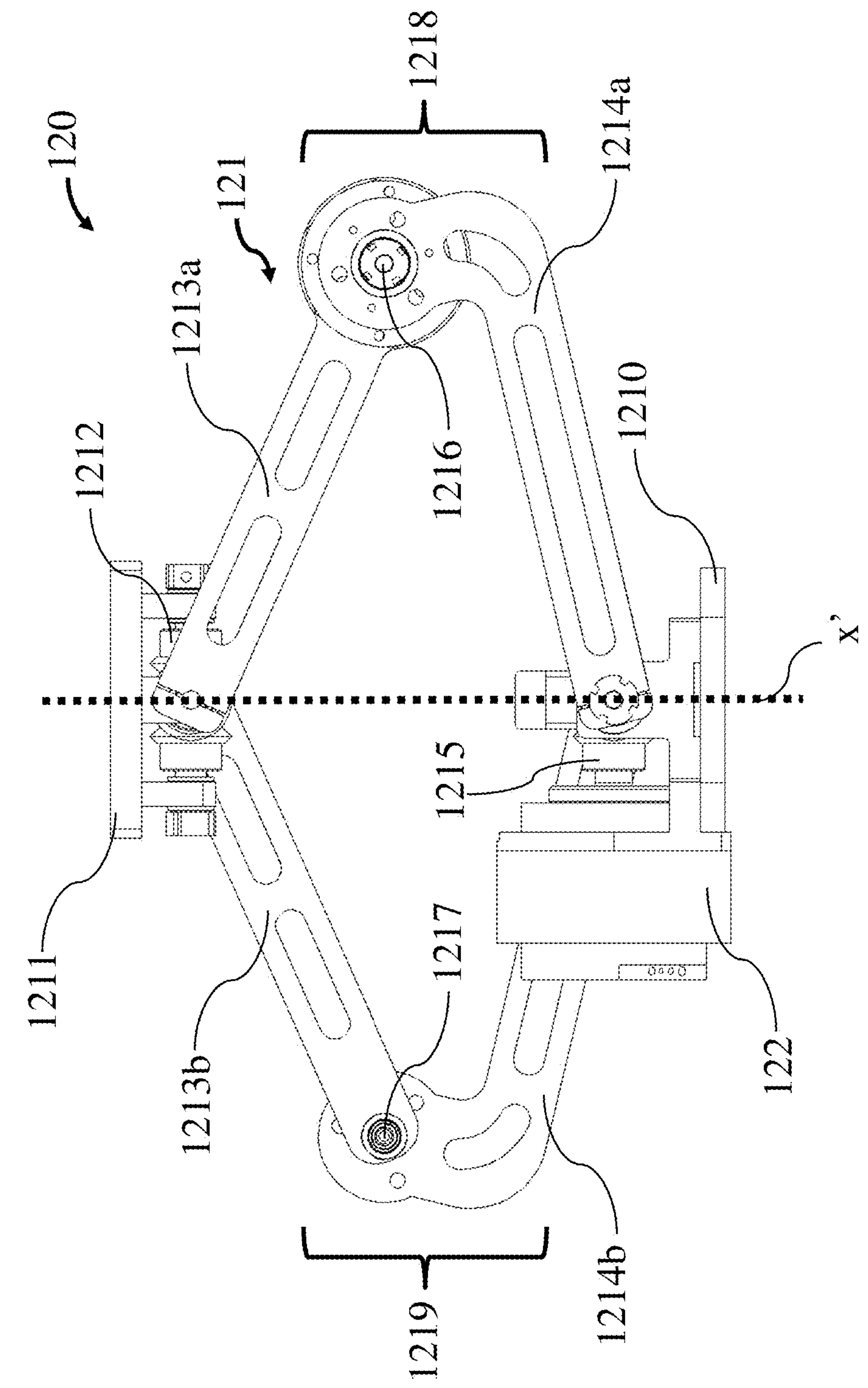
FIG. 2A shows a front view of the driving unit, according to the example embodiment of FIG. 1.
Figure 2B:
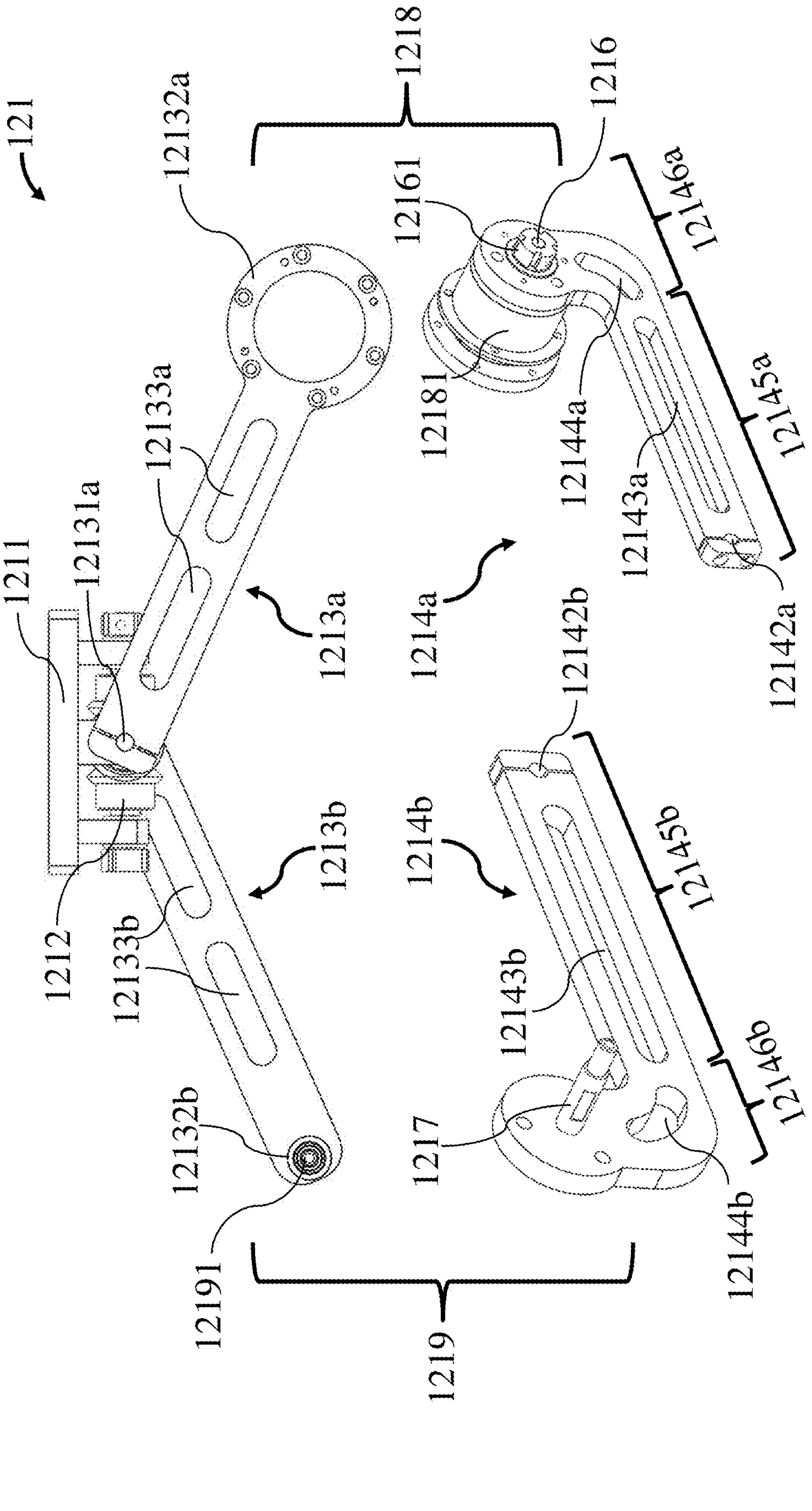
FIG. 2B is an exploded view illustrating the partial and related components of the upper part of the driving unit and their assembly relationship, according to the example embodiment of FIG. 2A.
Figure 3A:
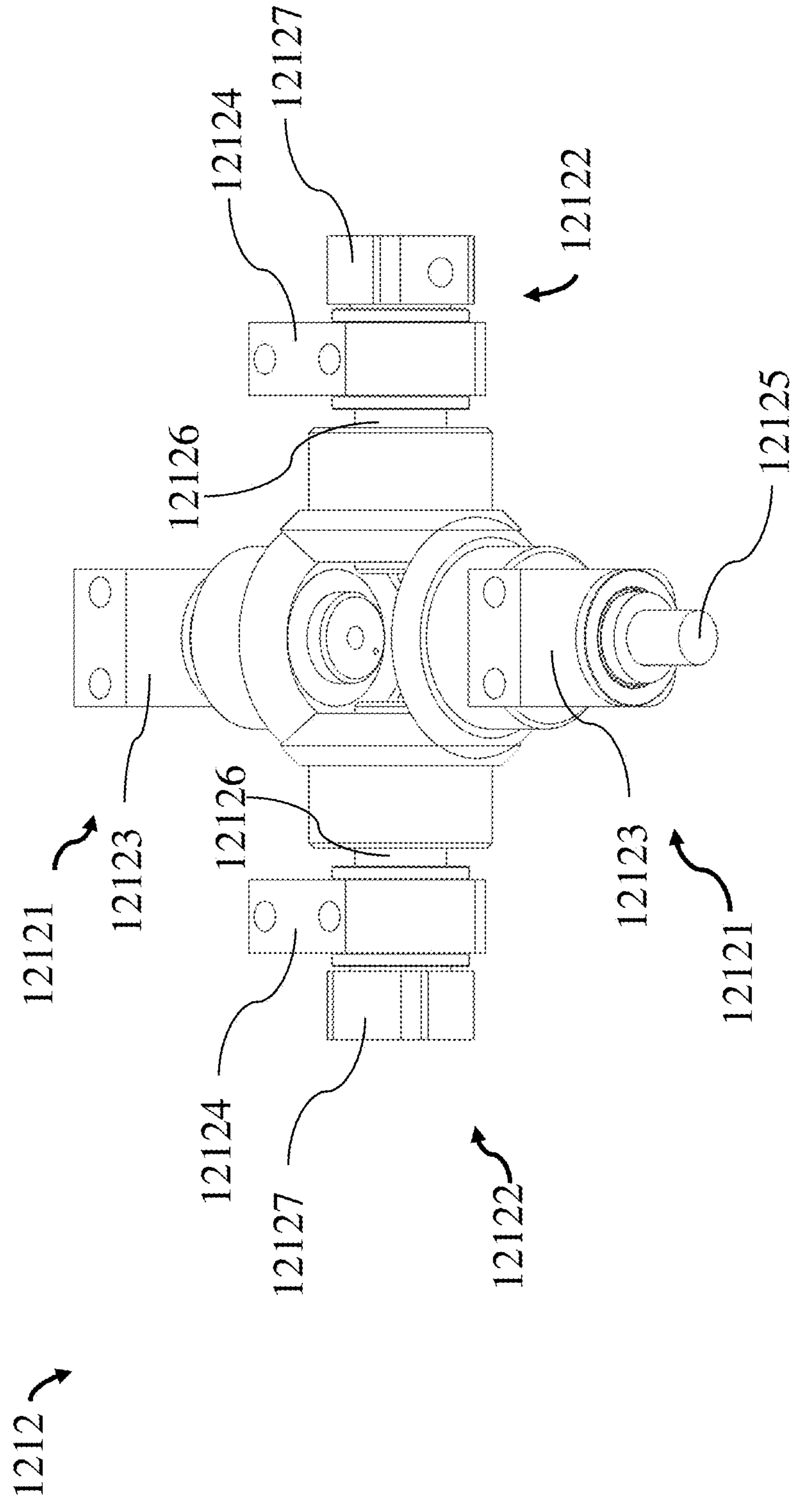
FIG. 3A is a perspective view of an upper bevel gear assembly, according to the example embodiment of FIG. 2B.
Figure 3B:
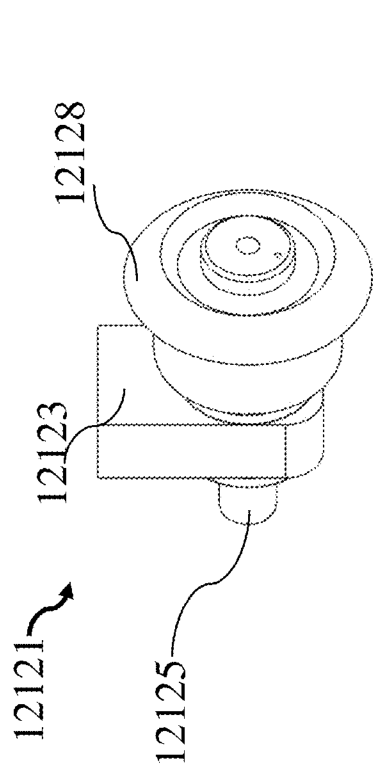
FIG. 3B is a perspective view of an active upper bevel gear unit, according to the example embodiment of FIG. 3A.
Figure 3C:
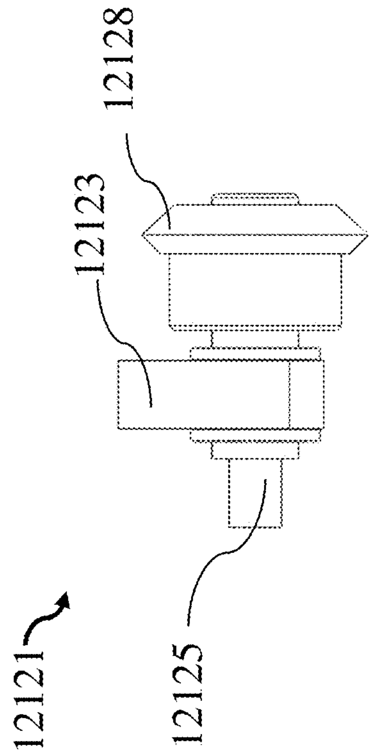
FIG. 3C is a front view of the active upper bevel gear unit, according to the example embodiment of FIG. 3A.
Figure 3D:
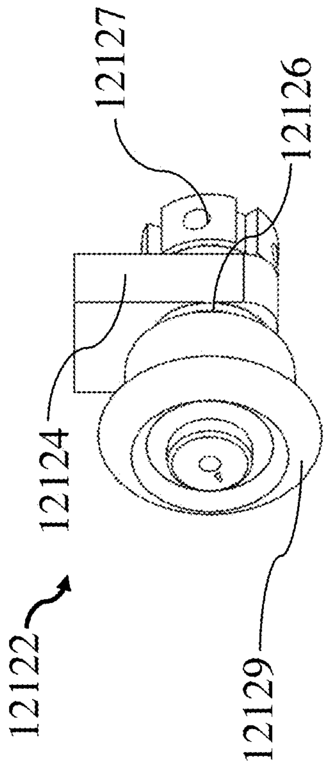
FIG. 3D is a perspective view of a passive upper bevel gear unit, according to the example embodiment of FIG. 3A.
Figure 3E:
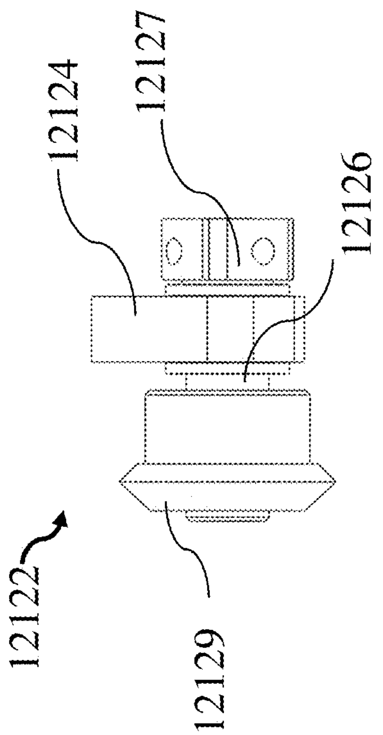
FIG. 3E is a front view of the passive upper bevel gear unit, according to the example embodiment of FIG. 3A.

FIGS. 2A-2B show the driving unit 120 and the components thereof. Referring to FIGS. 1A and 2A, the driving unit 120 generally contains the quadrilateral link mechanism 121, the first driving motor 122, and the second driving motor 123, wherein the quadrilateral link mechanism 121 contains an execution unit base 1211, a driving unit base 1210, a pair of upper cranks 1213*a* and 1213*b*, a pair of lower cranks 1214*a* and 1214*b*, an upper bevel gear assembly 1212, a lower bevel gear assembly 1215, a first shaft 1216 and a second shaft 1217. Each of the pair of upper cranks 1213*a* and 1213*b* and the pair of lower cranks 1214*a* and 1214*b* has a proximal portion and a distal portion. The upper bevel gear assembly 1212 operatively connects the proximal portions of the pair of upper cranks 1213*a* and 1213*b* with the execution unit base 1211, translating the motion of the upper cranks 1213*a* and 1213*b* to the motion of the execution unit base 1211. The lower bevel gear assembly 1215 operatively connects the distal portions of the pair of lower cranks 1214*a* and 1214*b* with the driving unit base 1210 and the first driving motor 122, translating the motion of the first driving motor 122 to the motion of the lower cranks 1214*a* and 1214*b*. The first shaft 1216 articulately connects the distal portions of the upper crank 1213*a* with the proximal portions of the lower crank 1214*a* and the second driving motor 123 to form the first joint 1218. The second shaft 1217 articulately connects the distal portions of the upper crank 1213*b* with the proximal portions of the lower crank 1214*b* to form the second joint 1219. Briefly, the four cranks 1213*a*, 1213*b*, 1214*a*, and 1214*b* are articulately connected by two bevel gears assemblies 1212 and 1215 and two joints 1218 and 1219 such that the articulated, quadrilateral mechanism is formed.

Still referring to FIG. 2A, a second central axis x', represented in a dotted line, extends in the longitudinal direction of the line connecting the geometric centers of the execution unit base 1211 and the driving unit base 1210.

FIG. 2B shows an exploded view illustrating partial and related components of the upper part of the driving unit 120 and their assembly relationships. Referring to FIGS. 2A and 2B, the upper crank 1213*a* is an elongated body containing a proximal shaft receiving hole 12131*a*, a ring-shaped distal connector 12132*a*, and two middle slots 12133*a*. The upper crank 1213*b* is an elongated body containing a proximal shaft receiving hole, a distal shaft receiving hole 12132*b*, and two middle slots 12133*b*, wherein the distal shaft receiving hole 12132*b* contains a joint bearing 12191.

Still referring to FIG. 2B, the lower crank 1214*a* is an elongated body containing a distal strip portion 12145*a* and a proximal curved portion 12146*a*, wherein the distal strip portion 12145*a* contains the distal portion of the lower crank 1214*a*, which contains a distal shaft receiving hole 12142*a* and a strip-shaped middle slot 12143*a*, and wherein the proximal curved portion 12146*a* extends upwardly from the distal strip portion 12145*a* and contains the proximal portion of the lower crank 1214*a* and a curved middle slot 12144*a*. The proximal portion of the lower crank 1214*a* further contains the first shaft 1216, a first shaft locking nut 12161, and a clutch unit 12181.

Still referring to FIG. 2B, the lower crank 1214*b* is an elongated body containing a distal strip portion 12145*b* and a proximal curved portion 12146*b*, wherein the distal strip portion 12145*b* contains the distal portion of the lower crank 1214*b*, which contains a distal shaft receiving hole 12142*b* and a strip-shaped middle slot 12143*b*, and wherein the proximal curved portion 12146*b* extends upwardly from the distal strip portion 12145*b* and contains the proximal portion of the lower crank 1214*b* and a curved middle slot 12144*b*. The proximal portion of the lower crank 1214*b* further contains the second shaft 1217.

Still referring to FIG. 2B, in this example, the middle slots 12133*a*, 12133*b*, 12145*a*, 12145*b*, 12146*a*, and 12146*b* are holes or grooves disposed on the bodies of the cranks to reduce the weight of cranks without compromising their structural integrity.

Still referring to FIG. 2B, the distal connector 12132*a* of the upper crank 1213*a* is sized and shaped to connect with the second driving motor 123 on its inner side and the clutch unit 12181 on the opposing, outer side, wherein the clutch unit 12181 is further connected to the proximal portion of the lower crank 1214*a* on the outer side, and the first shaft 1216 is connected to the proximal end of the lower crank 1214*a* with one end axially restricted by the first shaft locking nut 12161, and to the second driving motor 123 with the opposing end via the clutch unit 12181, which switchably and/or reversibly engages and disengages the second driving motor 123 with the first shaft 1216 for motion state switching purposes, thereby connecting the upper crank 1213*a* and the lower crank 1214*a* by forming the first joint 1218.

Still referring to FIG. 2B, the second shaft 1217 is connected to the proximal portion of the lower crank 1214*b* with one end and to the joint bearing 12191 of the upper crank 1213*b* with the other opposing end, wherein the joint bearing 12191 maintains the central position of the second shaft 1217, thereby connecting the upper crank 1213*b* and the lower crank 1214*b* by forming the second joint 1219.

Still referring to FIG. 2B, the proximal shaft receiving holes of the pair of upper cranks 1213*a* and 1213*b* are sized and shaped to match with and operatively connected to the upper bevel gear assembly 1212, which is further connected with the execution unit base 1211, thereby translating the motion of the pair of upper cranks 1213*a* and 1213*b* to the motion of the execution unit base 1211.

Upper Bevel Gear Assembly

FIGS. 3A-3E show an example upper bevel gear assembly 1212 and the components thereof. Referring to FIGS. 3A-3E with reference to FIG. 1, the upper bevel gear assembly 1212 generally contains a pair of active upper bevel gear units 12121, a pair of passive upper bevel gear units 12122. Each active upper bevel gear unit 12121 generally contains an active upper bevel head 12128, an active upper bearing unit 12123 having an active upper bearing unit housing configured to fixedly connect with the execution unit base, and an active upper shaft 12125 sized and shaped for engaging the active upper bevel head 12128 and the active upper bearing unit 12121, such that rotation of the active upper shaft 12125 drives the rotation of the active upper bevel head 12128. The active upper bevel gear head 12128 generally contains a truncated conical head portion with a slant smooth face with a pitch angle of about 45 degrees.

Similarly, each passive upper bevel gear unit 12122 generally contains a passive upper bevel head 12129, a passive upper bearing unit 12124 having a passive bearing unit housing to fixedly connect with the execution unit base, and a passive upper shaft 12126 sized and shaped for engaging the passive upper bevel head 12129 and the passive upper bearing unit 12123, such that the rotation of the passive upper bevel head 12129 drive the rotation of the passive upper shaft 12126. The passive upper bevel gear head 12129 generally contains a truncated conical head portion with a slant smooth face with pitch angle of about 45 degrees. In this example, passive upper bevel gear unit 12122 further contains an upper locking nut 12127, configured to restrict the axial movement of the passive upper shaft 12126.

In this example, the pair of the active upper bevel gear units 12121 and the pair of passive upper bevel gear units 12122 are disposed such that the active/passive bevel heads are facing towards each other in direct, frictional contact with one another with the truncated conical head portions. The sizes and shapes of the bevel heads of the pair of the active upper bevel gear unit 12121 and the pair of the passive upper bevel gear unit 12122 are generally the same, each with a pitch angle of about 45 degrees, such that the shaft angle between the adjacent active upper shaft and passive upper shaft is about 90 degrees. The pair of the active upper bevel gear units 12121 are configured to rotate in opposing direction to drive the pair of the active upper bevel gear units 12121 to rotate synchronously. The angular motion of the upper cranks 1213*a* and 1213*b* is then translated to linear motion of the execution unit base plate via the upper bevel gear assembly 1212.

Lower Bevel Gear Assembly

Figure 4A:
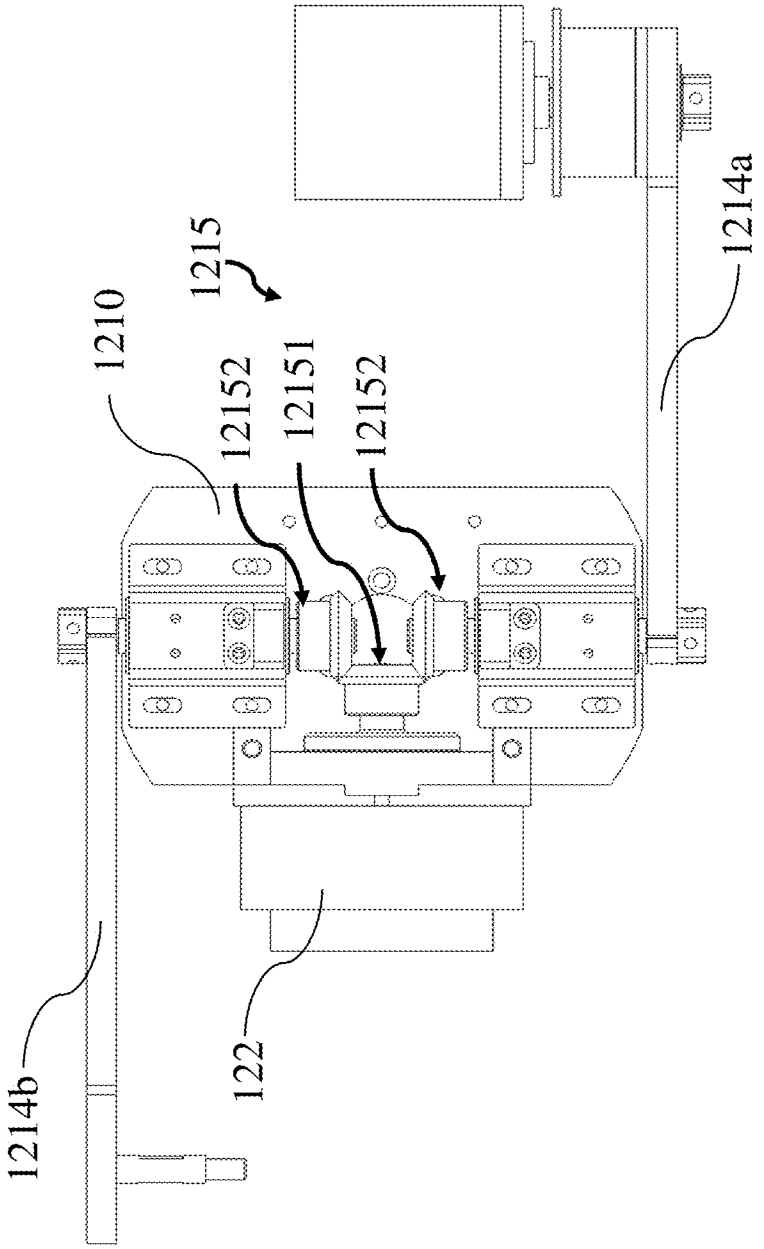
FIG. 4A is a partial view of partial and related components of the lower part of the driving unit and their assembly relationships, according to the example embodiment of FIG. 2A.
Figure 4B:
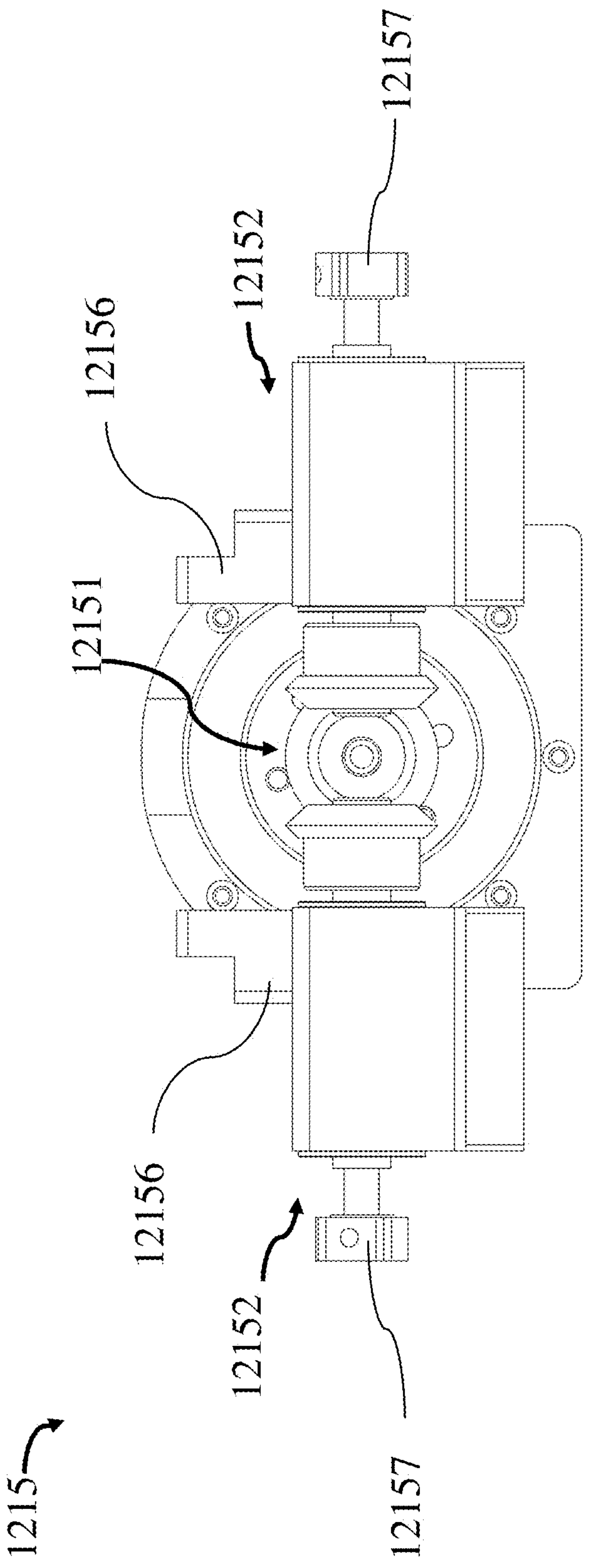
FIG. 4B is a front view of the lower bevel gear assembly connected with the first driving motor, according to the example embodiment of FIG. 4A.
Figure 4C:
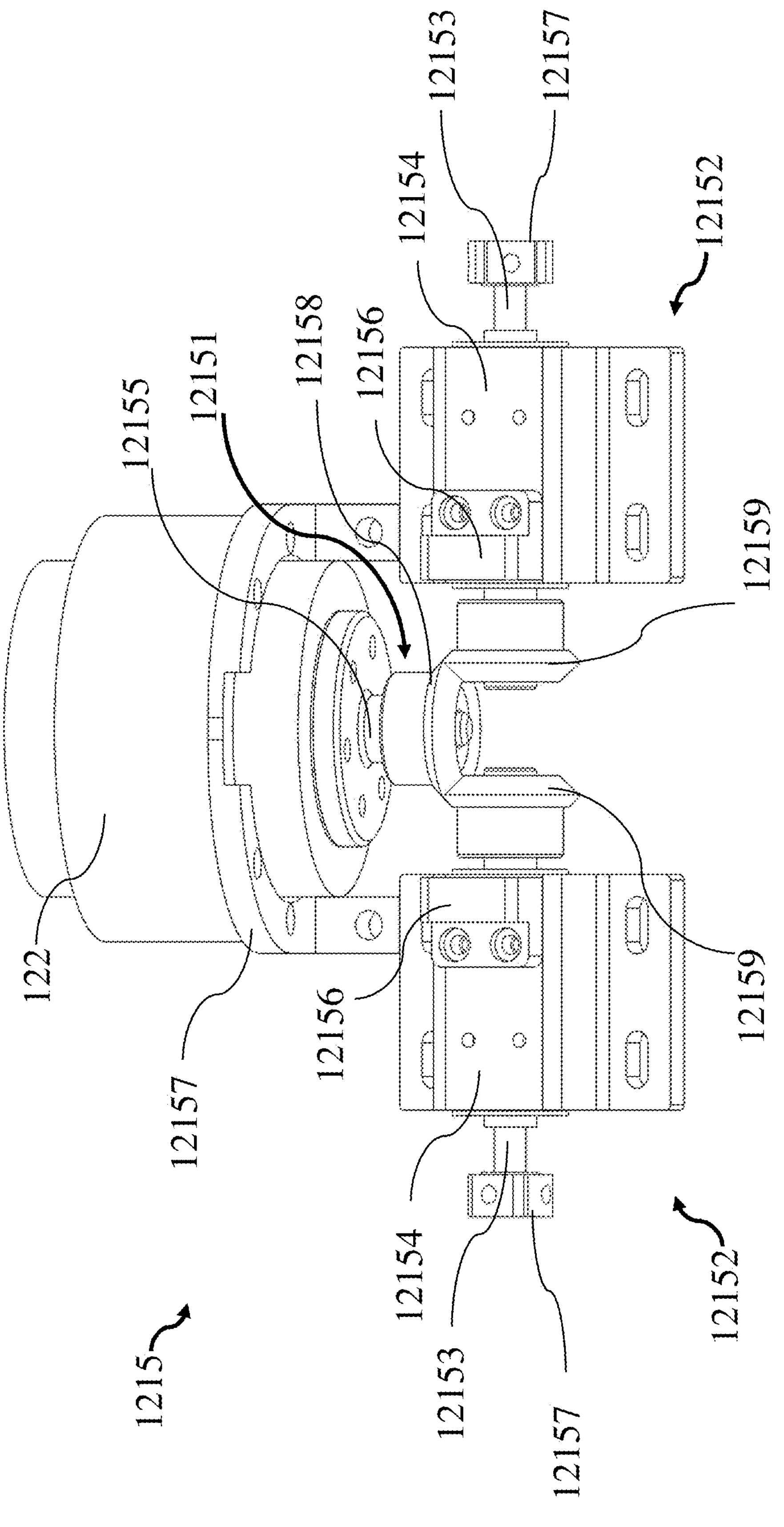
FIG. 4C is a perspective view of the lower bevel gear assembly connected with the first driving motor, according to the example embodiment of FIG. 4A.

FIG. 4A show the partial top view illustrating partial and related components of the lower part of the driving unit 120 and their assembly relationships. FIGS. 4B-4C show a side view and a perspective view of the lower bevel gear assembly, respectively. Now referring to FIG. 4A, the lower bevel gear assembly 1215 generally contains an active lower bevel gear unit 12151 operatively connected with and driven by the first driving motor 122, and a pair of passive lower bevel gear units 12152 operatively connected with distal portions of the pair of lower cranks 1214*a* and 1214*b*. The lower bevel gear assembly 1215 fixedly connects with and supported by the driving unit base 1210.

Now referring to FIGS. 4B-4C, the lower bevel gear assembly 1215 generally contains an active lower bevel gear unit 12151, and a pair of passive lower bevel gear units 12152. The active lower bevel gear unit 12151 generally contains an active lower bevel head 12158, and an active lower shaft 12155 sized and shaped for engaging the active lower bevel head 12158, such that rotation of the active lower shaft 12155 drives the rotation of the active lower bevel head 12158. The active lower bevel gear head 12158 generally contains a truncated conical head portion with a slant smooth face with a pitch angle of about 45 degrees.

Similarly, each passive lower bevel gear unit 12152 generally contains a passive lower bevel head 12159, a passive lower bearing unit 12154 having a passive bearing unit housing to fixedly connect with the driving unit base 1210, and a passive lower shaft 12153 sized and shaped for engaging the passive lower bevel head 12159 and the passive lower bearing unit 12154, such that rotation of the passive upper bevel head 12129 drives the rotation of the passive lower shaft 12153. The passive lower bevel gear head 12129 generally contains a truncated conical head portion with a slant smooth face with pitch angle of about 45 degrees. In this example, the passive upper bevel gear unit 12152 further contains a lower locking nut 12157, configured to restrict the axial movement of the passive lower shaft 12126 and secures the lower cranks 1214*a* or 1214*b* and outer end of the lower shaft 12126.

Now referring to FIG. 4C, in this example, the lower bevel gear assembly 1215 further contains a first motor mounting bracket 12157 configured to fixedly connect the first driving motor 122 to the lower bevel gear assembly 1215. In this example, the lower bevel gear assembly 1215 further contains a pair of L-shaped support limit blocks 12156 disposed on top of the pair of lower bearing housings and configured to restrict the downward movement range of the upper cranks of the driving unit 120 to prevent damage to the robotic arm 100.

Now referring to FIGS. 4A-4C, the active lower bevel gear unit 12151 and the pair of passive upper bevel gear units 12152 are disposed such that the active/passive bevel heads are facing towards each other in direct, frictional contact with one another with the truncated conical head portions. The sizes and shapes of the bevel heads of the pair of the active lower bevel gear unit 12151 and the pair of the passive upper bevel gear unit 12152 are generally the same, each with a pitch angle of about 45 degrees, such that the shaft angle between the adjacent active lower shaft and passive lower shaft is about 90 degrees. The active lower bevel gear unit 12151 is configured to rotate to drive the pair of the active upper bevel gear units 12151 to rotate synchronously. The active lower bevel gear unit 12151 is operatively connected with and driven by the first driving motor 122 via the active lower shaft 12155. The pair of passive lower bevel gear units 12152 engaged with the active lower bevel gear unit 12151 and connected with the distal portions of the pair of lower cranks 1214*a* and 1214*b* via the pair of passive lower shafts 12153, such that rotary motion from the first driving motor 122 is translated to angular motion of the pair of lower cranks 1214*a* and 1214*b* via the lower bevel gear assembly 1215.

Base Unit

Figure 5A:
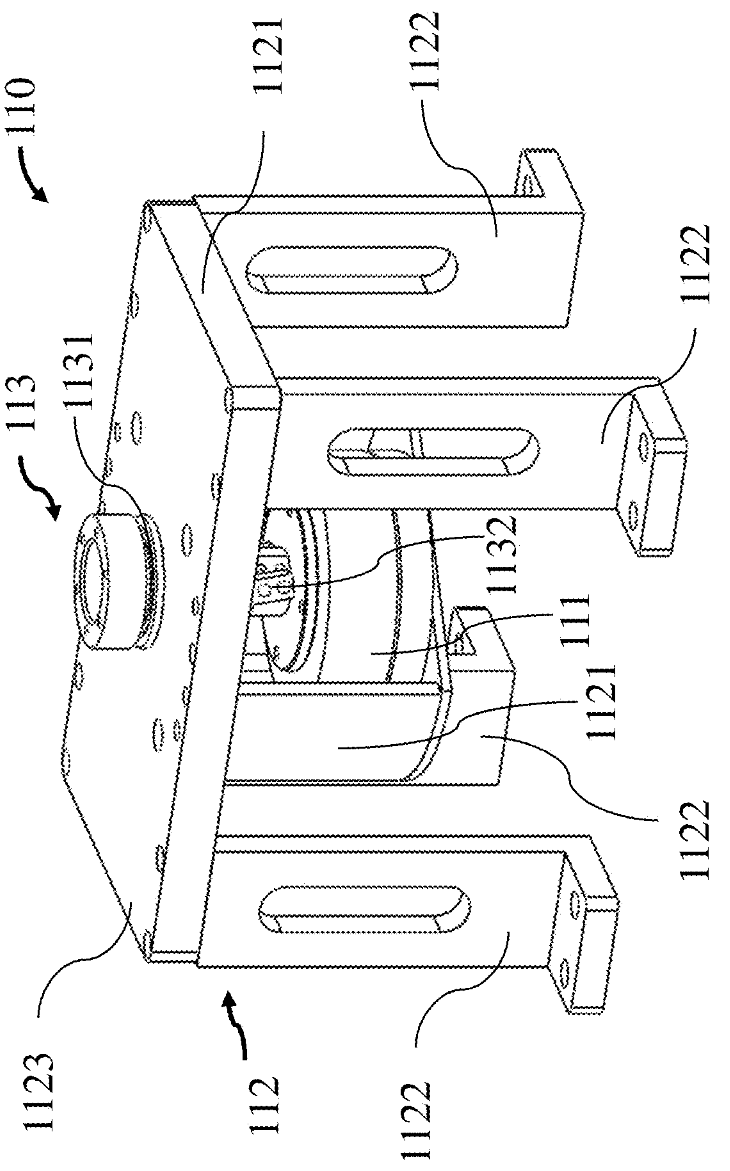
FIG. 5A is a perspective view of the base unit, according to the example embodiment of FIG. 1.
Figure 5B:
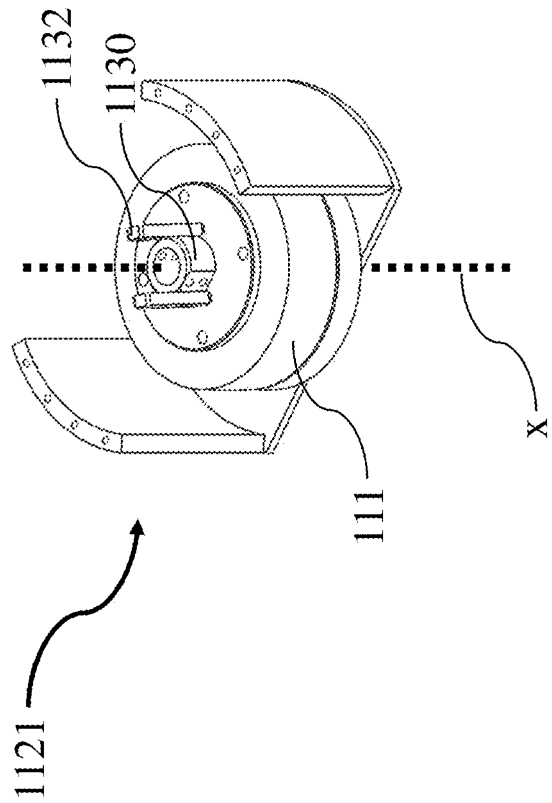
FIG. 5B is a perspective view of the base motor connected with the base motor support module, according to the example embodiment of FIG. 5A.

FIGS. 5A-5B show an example base unit 110 and the components thereof. Referring to FIG. 5A, the base unit 110 generally contains the base motor 111, the base 112, and the main shaft 113. In this example, the base 112 generally contains a base plate 1123, a motor supporting frame 1121 and four supporting legs 1122. The motor supporting frame 1121 is fixedly connected with the base plate 1123 at the lower side configured to house the base motor 111 therein. The four supporting legs 1122, each of which contains a horizonal foot portion for fixing to or connecting with a substrate, and a vertical, elongated leg portion having a length longer than that of the base motor supporting frame 1121 and fixedly connected with the lower side of base plate 1123 proximate to the four corner sides thereof, providing enough space for holding base motor supporting frame 1121 and the base motor 111 provided therein to ensure the overall structure's stability. Each of leg portions of the four supporting legs further contains a slot, reducing the weight of the supporting leg without compromising its structural integrity. The motor is positioned beneath the base plate 1123 and generally in alignment with the geometrical center of the base 112. Referring to FIGS. 5A-5B, the main shaft unit 113 contains a main shaft 1130, one or more washers 1131, and a transmission disc 1132, wherein the main shaft 1130 extends through the base 112 with the upper end operatively connected with the driving unit installed above the base 112 and the opposing lower end operatively connected with the transmission disc 1132, transmitting the rotary motion of the base motor 111 across the base 112 to the driving unit. The one or more washers 1131 reduce the main shaft vibration and serve as limiting elements to the main shaft 1130.

Now referring to FIG. 5B, in this example, the base motor supporting frame 1121 contains two curved supporting wall and a horizontal motor supporting base plate, defining a space for housing the base motor 111 therein. The base motor 111 is fixedly connected with and supported by the motor supporting base plate. The base motor 111 is configured to drive the driving unit via the main shaft unit 113, which translates the rotary motion of the base motor 111 to the driving unit substantially about the first central axis x. The main shaft 1130 is operatively connected with the base motor 111 via the transmission disc 1132, which transmits the rotary motion of the base motor 111 to the main shaft 113.

Motions of Robotic Arm

FIGS. 6A-6D illustrate the examples of different motions of the robotic arm 100, including the rotary motion of the driving unit 120, the motions of the driving unit 120 in the retracted states, extended states, bending states, respectively.

Figure 6A:
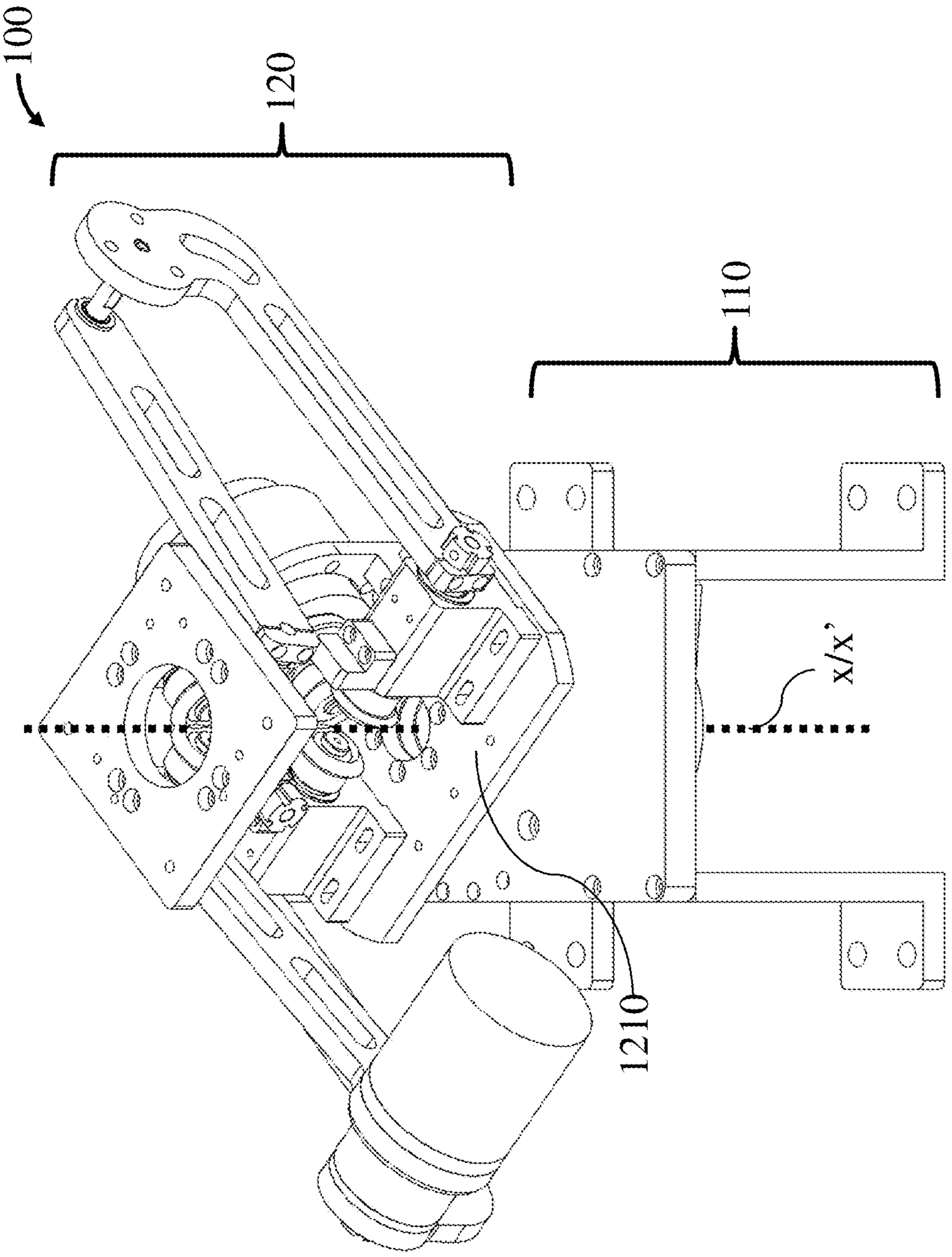
FIG. 6A is another perspective view of the example robotic arm showing the driving unit 120 rotating in one DoF, according to the example embodiment of FIG. 1.

FIG. 6A shows an example rotary motion of the driving unit 120. Now referring to FIG. 6A with reference to FIG. 1, in this example, the driving unit base 1210 supports the driving unit 120 installed thereon and is operatively connected with the base motor 111 via the main shaft unit 113 of the base unit 110 such that the first central axis x substantially aligns with the second central axis x'. The base motor 111 is configured to provide with rotary motion, which is transmitted to the driving unit base 1210 and thus the driving unit 120 via the main shaft unit 113 about the first/second central axis x/x', enabling the driving unit 120 to actuate in one degree of freedom. In this example, the driving unit 120 is in a partially retracted/extended state. It is understood that the rotary motion can be operated in any retracted and/or extended states (including the bending states).

Figure 6B:
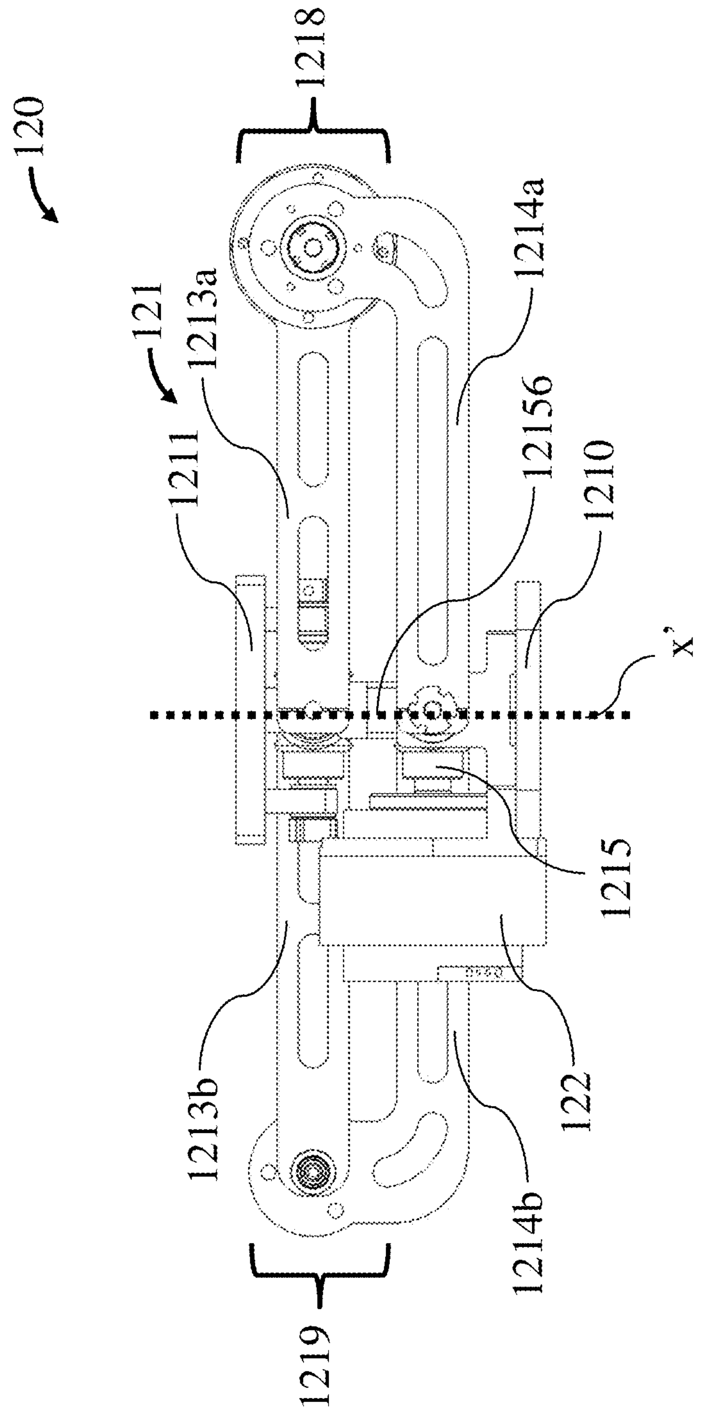
FIG. 6B is another front view of the driving unit in a fully retracted state, according to the example embodiment of FIG. 2A.

Now referring to FIG. 6B, the driving unit 120 is in a fully retracted state, in which the distance between the execution unit base 1211 and the driving unit base 1210 is minimized to a distance corresponding to the limitation that the support limit blocks 12156 enforce on the driving unit 120 to move downward along the second central axis x'.

Now referring to FIG. 6B with reference to FIGS. 1 and 2B, in the fully retracted state, the pair of upper cranks 1213*a* and 1213*b* are on opposing sides relative to the second central axis x' and reaching their horizontal maximal distance, and so are the pair of the lower cranks 1214*a* and 1214*b*. The first joint 1218 and second joint 1219 are disengaged from each other. The clutch unit 12181 of the first joint 1218 also disengages the connection between the second driving motor 123 and the first shaft 1216.

Figure 6C:
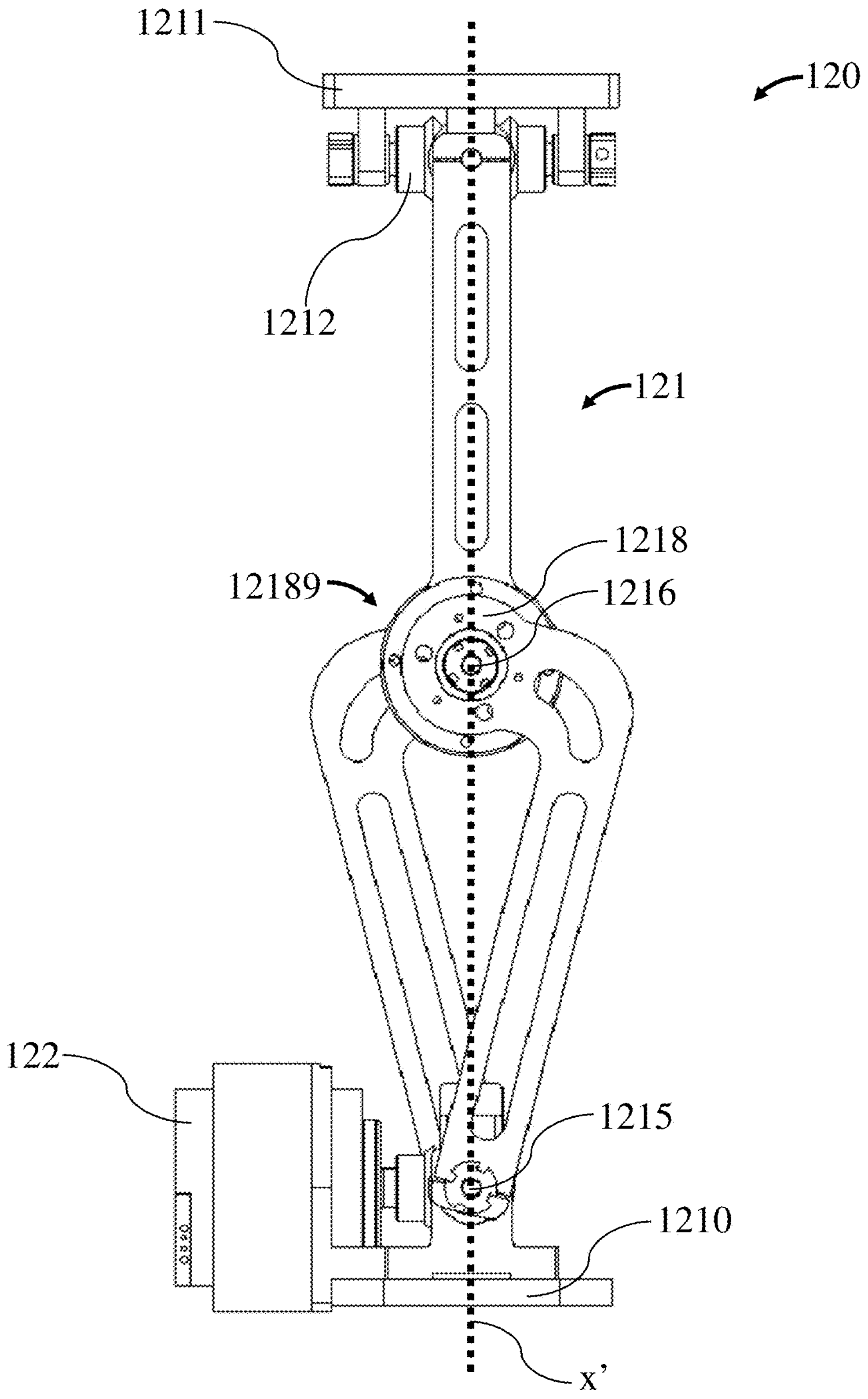
FIG. 6C is another front view of the driving unit in a fully extended state, according to the example embodiment of FIG. 2A.

Now referring to FIG. 6C, the driving unit 120 is in a fully extended state, in which the distance between the execution unit base 1211 and the driving unit base 1210 is maximized to a distance that the quadrilateral link mechanism 121 allows the execution unit base 1211 to be disposed away from the driving unit base 1210 along the second central axis x'.

Now referring to FIG. 6C with reference to FIGS. 1 and 2B, in the fully extended state, the pair of upper cranks 1213*a* and 1213*b*, the first joint 1218, and the second joint 1219 are all substantially aligned with the second central axis x'. The clutch unit 12181 of the first joint 1218 reversibly and/or switchably engages and disengages the connection between the second driving motor 123 and the first shaft 1216 such that the quadrilateral link mechanism 121 is switchable from the fully extended state to one of the bending states, and vice versa.

Now referring to FIGS. 6A-6C with reference to FIGS. 1 and 2B, in the retracted states or extended states, the first driving motor 122 drives the quadrilateral link mechanism 121 to switch between different states, while the second driving motor 123 is disengaged with the first shaft 1216, causing the disengagement between the first joint 1218 and the second joint 1219. The lower bevel gear assembly 1215 translates motion of the first driving motor 122 to motion of the pair of lower cranks 1214*a* and 1214*b*, which simultaneously actuates the motion of the pair of upper cranks 1213*a* and 1213*b* connected with them via the first joint 1218 and second joint 1219. The upper bevel gear assembly 1212 further translates motion of the pair of upper cranks 1213*a* and 1213*b* to motion of the execution unit base 1211.

Figure 6D:
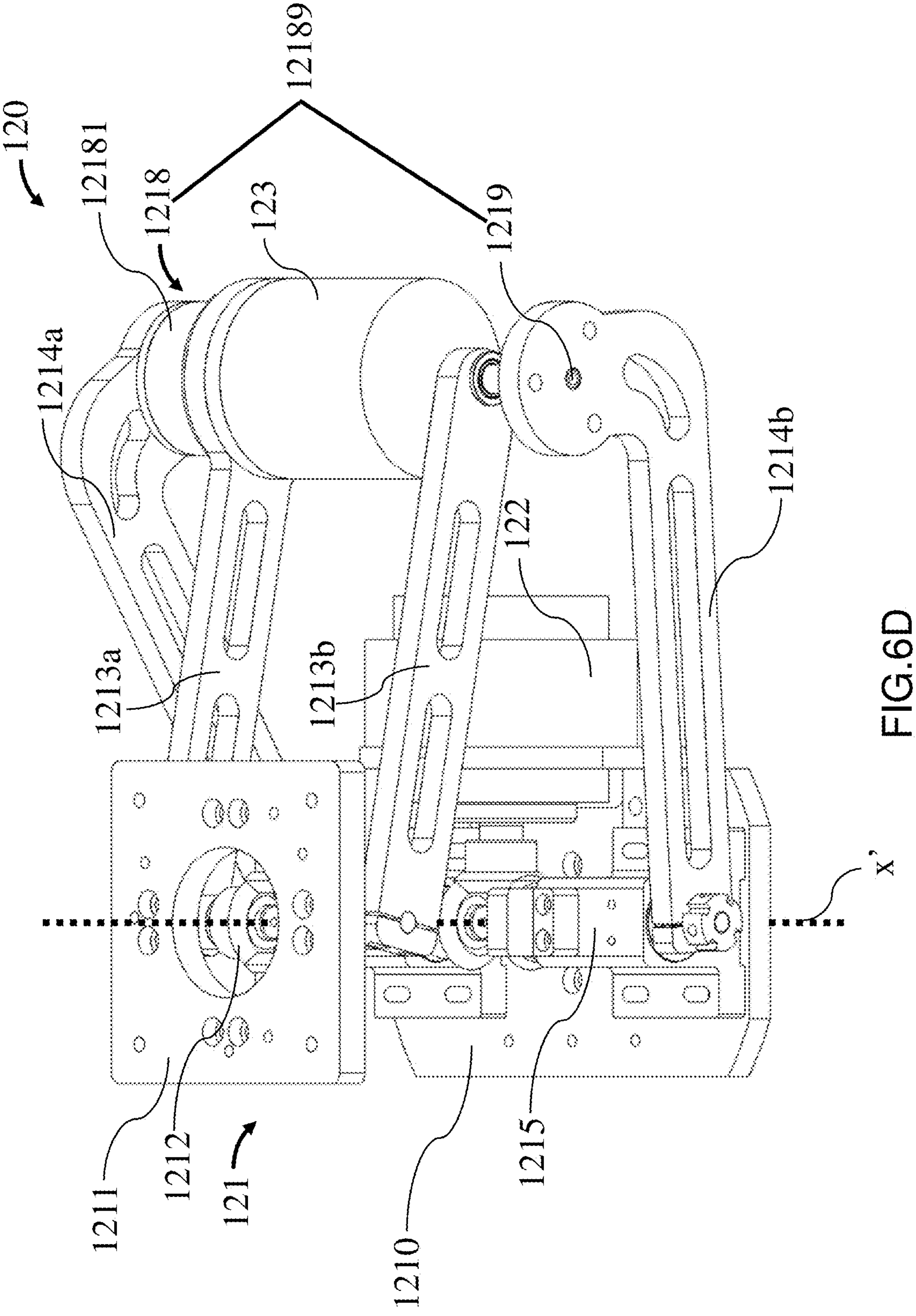
FIG. 6D is a perspective view of the driving unit in a bending state, according to the example embodiment of FIG. 2A.

FIG. 6D shows an example where the driving unit 120 is in a bending state. Now referring to FIG. 6D with reference to FIG. 2B, the first joint 1218 and the second joint 1219 simultaneously operate on the same side relative to the second central axis x' and are engaged to form an articulation joint 12189, in which the clutch unit 12181 of the first joint 1218 engages the second driving motor 123 with the first shaft 1216, such that the first joint 1218 becomes an active joint driven by the second driving motor 123 via the first shaft 1216 and the second joint 1219 becomes a passive joint driven by the first joint 1218, thereby allowing rotary motion of the pair of upper cranks 1213*a* and 1213*b* relative to the pair of lower cranks 1214*a* and 1214*b* and enabling controlled angular adjustment, by the second driving motor 123, between the two pairs of cranks while maintaining the structural integrity of the overall structure.

Now referring to FIGS. 6A-6D, the robotic arm 100 is configured to perform complex motions by simultaneously or consecutively combining the rotary motion and the motions of the driving unit 120 in (partial or fully) retracted states, extended states, and bending states.

The exemplary embodiments of the present invention are thus fully described. Although the description referred to particular embodiments, it will be clear to one skilled in the art that the present invention may be practiced with variation of these specific details. Hence this invention should not be construed as limited to the embodiments set forth herein.

For example, in certain examples, the base motor provides rotary driving motion to the driving unit in one DoF. In other examples, other types of base motor and additional components can be provided instead, making the driving unit 120 connected to the base unit 110 in such a way that the second central axis x' may or may not be aligned with the first central axis x. This misalignment may cause an angular difference between the two axes, enabling the driving unit 120 to actuate in more than one degree of freedom.

What is claimed is:

1. A robotic arm, comprising:

a base unit and a driving unit that are operatively connected with each other, wherein the base unit comprises:

a base motor that is operatively connected with the driving unit and is configured to drive the driving unit to move in at least one degree of freedom; and a base that is configured to support the base motor and the driving unit, wherein the driving unit comprises:

a quadrilateral link mechanism;

a first driving motor that is operatively connected with the quadrilateral link mechanism and is configured to drive the quadrilateral link mechanism to be switchable at least between a retracted state and an extended state; and a second driving motor that is operatively connected with the quadrilateral link mechanism and is configured to drive the quadrilateral link mechanism to be switchable at least from the extended state to at least one bending state; wherein the quadrilateral link mechanism comprises:

an execution unit base, operatively connected with an end effector;

a driving unit base, operatively connected with the base unit;

a pair of upper cranks and a pair of lower cranks, each of which comprises a proximal portion and a distal portion;

an upper bevel gear assembly;

a lower bevel gear assembly;

a first shaft and a second shaft, wherein the upper bevel gear assembly operatively connects the proximal portions of the pair of upper cranks with the execution unit base, wherein the lower bevel gear assembly operatively connects the distal portions of the pair of lower cranks with the driving unit base, and wherein the first shaft and the second shaft articulately connect the distal portions of the pair of upper cranks with the proximal portions of the pair of lower cranks to form a first joint and a second joint, respectively, such that an articulated, quadrilateral link mechanism is formed.

2. The robotic arm of claim 1, wherein, at the extended state, the first joint engages with the second joint to form an articulation joint such that the pair of upper cranks is rotatable relative to the pair of lower cranks about the articulation joint, thereby switching to at least a bending state.

3. The robotic arm of claim 1, wherein the second driving motor is operatively connected with the first joint via the first shaft.

4. The robotic arm of claim 1, wherein the first joint further comprises a clutch unit that reversibly engages and disengages the second driving motor with the first shaft at the extended state.

5. The robotic arm of claim 1, wherein the second joint is a passive joint and further comprises a joint bearing unit to support the second shaft to maintain central position thereof.

6. The robotic arm of claim 1, wherein the upper bevel gear assembly comprises a pair of active upper bevel gear units driven by the pair of upper cranks respectively, and a pair of passive upper bevel gear units engaged with the pair of active upper bevel gear units and connected with the execution unit base, such that motion of the pair of upper cranks is translated to motion of the execution unit base.

7. The robotic arm of claim 6, wherein the upper bevel gear assembly further comprises a pair of active upper shafts transmitting motion of the pair of upper cranks to motion of the pair of active upper bevel gear units, and a pair of passive upper shafts connected to the pair of passive upper bevel gear units.

8. The robotic arm of claim 7, wherein the upper bevel gear assembly further comprises a pair of active upper bearing housings and a pair of passive upper bearing housings, which are connected to the execution unit base and respectively support the pair of active upper shafts and the pair of passive upper shafts to maintain central position thereof.

9. The robotic arm of claim 7, wherein the upper bevel gear assembly further comprises a pair of upper locking nuts, configured to restrict axial movement of the pair of passive upper shafts.

10. The robotic arm of claim 1, wherein the lower bevel gear assembly comprises an active lower bevel gear unit driven by the first driving motor; and a pair of passive lower bevel gear units engaged with the active lower bevel gear unit and connected with the distal portions of the pair of lower cranks respectively, such that motion from the first driving motor is translated to motion of the pair of lower cranks.

11. The robotic arm of claim 10, wherein the lower bevel gear assembly further comprises a pair of passive lower shafts respectively connected with the distal portions of the pair of lower cranks.

12. The robotic arm of claim 11, wherein the lower bevel gear assembly further comprises a pair of lower bearing housings, connected with the driving unit base and supporting the pair of passive lower shafts to maintain central positions thereof respectively.

13. The robotic arm of claim 11, wherein the lower bevel gear assembly further comprises a pair of lower locking nuts, configured to restrict axial movement of the pair of passive lower shafts respectively.

14. The robotic arm of claim 1, wherein the lower bevel gear assembly further comprises one or more support limit blocks, configured to restrict the downward movement range of the driving unit to prevent damage to the robotic arm.

15. The robotic arm of claim 1, wherein the base motor is connected with the driving unit base via a main shaft such that the rotation of the base motor is transmitted to motion of the driving unit.

16. A robotic system, comprising:

one or more robotic arms as claimed in claim 1; and one or more end effectors, wherein the robotic arms and the end effectors are operatively connected with each other.

17. The robotic system of claim 16, wherein the end effector is a robotic hand.

18. A robotic arm for an end effector, comprising:

a base unit, a driving unit and an execution unit that are operatively connected with each other, wherein the base unit comprises:

a base motor that is operatively connected with the driving unit and is configured to drive the driving unit to rotate about central axis thereof; and a base that is configured to support the base motor and the driving unit, wherein the driving unit comprises:

a quadrilateral link mechanism;

a first driving motor that is operatively connected with the quadrilateral link mechanism and is configured to drive the quadrilateral link mechanism to be switchable at least between a retracted state and an extended state; and a second driving motor that is operatively connected with the quadrilateral link mechanism and is configured to drive the quadrilateral link mechanism to be switchable at least from the extended state to at least one bending state, wherein the quadrilateral link mechanism comprises:

an execution unit base for connecting with the end effector;

a driving unit base for connecting with the base unit;

a pair of upper cranks and a pair of lower cranks, each of which comprises a proximal portion and a distal portion;

an upper bevel gear assembly;

a lower bevel gear assembly;

a first shaft and a second shaft, and wherein the execution unit comprises or operatively connects with an execution unit base that operatively connects with the driving unit and an end effector, wherein the upper bevel gear assembly operatively connects the proximal portions of the pair of upper cranks with the execution unit base, wherein the lower bevel gear assembly operatively connects the distal portions of the pair of lower cranks with the driving unit base, wherein the first shaft and the second shaft articulately connect the distal portions of the pair of upper cranks with the proximal portions of the pair of lower cranks to form a first joint and a second joint, respectively, such that an articulated, quadrilateral link mechanism is formed, and wherein, at the extended state, the first joint engages with the second joint to form an articulation joint such that the pair of upper cranks is rotatable relative to the pair of lower cranks about the articulation joint, thereby switching to the at least one bending state.

19. A robotic system, comprising:

one or more robotic arms as claimed in claim 18; and one or more end effectors, wherein the robotic arms and the end effectors are operatively connected with each other.

20. The robotic system of claim 19, wherein the end effector is a robotic hand.

* * * * *